Jan. 28, 1964  Q. MARTIN  3,119,221
ATTACHMENT FOR A CROP PICKUP
Filed May 17, 1962  3 Sheets-Sheet 1

Quintin N. Martin
INVENTOR.

BY *[signatures]*
Attorneys

Quintin N. Martin
INVENTOR.

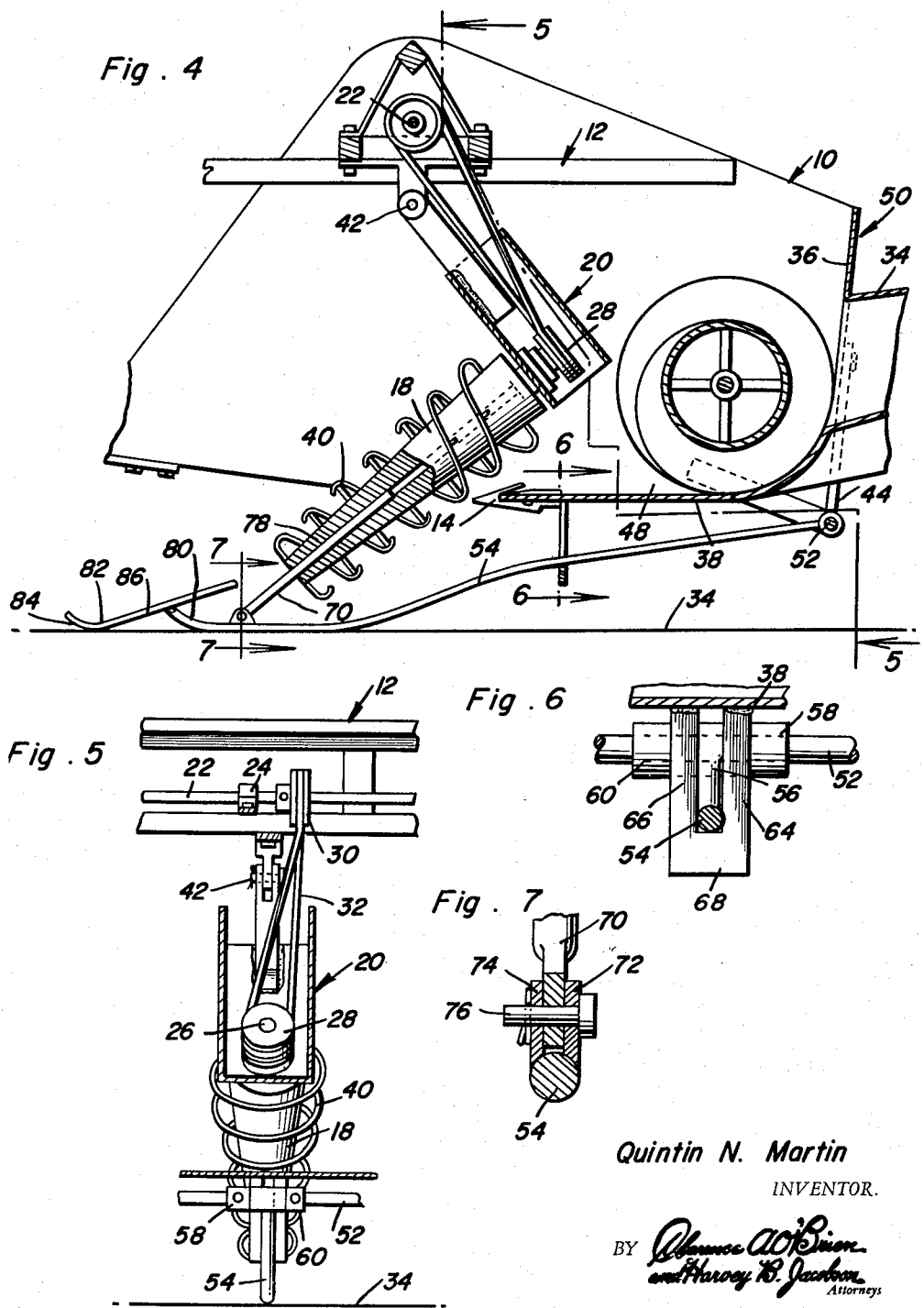

United States Patent Office 3,119,221
Patented Jan. 28, 1964

3,119,221
ATTACHMENT FOR A CROP PICKUP
Quintin N. Martin, Moscow, Kans.
(600 Jefferson, Hugoton, Kans.)
Filed May 17, 1962, Ser. No. 195,605
8 Claims. (Cl. 56—119)

This invention relates to a novel and useful attachment for a crop pickup of the type provided with a main frame and adapted to be forwardly advanced over a field and a plurality of generally parallel conveyor rolls which are mounted for rotation about axes extending longitudinally of the roll and forwardly and downwardly of the main frame of the crop pickup machine.

Crop pickup machines provided with conveyor rolls, while being very effective in picking up fallen crops, are subject to having the forwardmost ends of the downwardly inclined conveyor rolls dig into the ground should the field over which the crop pickup machine is moving be uneven. When one or more conveyor rolls dig into the ground, unless the crop pickup machine can be quickly stopped severe damage can be inflicted upon the conveyor rolls.

It is therefore the primary object of this invention to provide an attachment for a crop pickup machine of the type set forth above in the form of a modification for the crop pickup machine which will enable each of the conveyor rolls to pivot somewhere adjacent its upper end about an axis extending transversely of the longitudinal axis of the conveyor roll. In this manner, individual crop pickup rolls may be raised and lowered in conformancy with the contour of the ground over which the crop pickup machine is moving.

A further object of this invention, in accordance with the immediately preceding object, is to provide ground engaging skid means for the lowermost ends of each conveyor roll which is adapted to engage the ground over which the pickup machine is being moved and to raise and lower each pickup roll as it encounters uneven terrain.

A still further object of this invention, in accordance with the preceding objects, is to provide a ground engaging skid for each of the conveyor rolls which, an addition to raising and lowering the lower end of each conveyor roll as it moves over uneven terrain, will also assist in accomplishing a more thorough job of picking up fallen crops.

Still another object of this invention is to provide an attachment for conventional existing types of crop pickup machines provided with conveyor rolls of the type hereinbefore set forth which may be readily incorporated into the existing types of crop pickup machines.

A final object of this invention to be specifically enumerated herein is to provide an attachment for a crop pickup machine in accordance with the preceding objects which will conform to conventional forms of manufacture, be of simple construction and easy to install so as to provide a device that will be economically feasible, longlasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a fragmentary longitudinal vertical sectional view taken substantially upon a plane passing through the longitudinal center line of one of the conveyor rolls;

FIGURE 5 is a fragmentary transverse vertical sectional view taken substantially upon the plane indicated by section line 5—5 of FIGURE 4;

FIGURE 6 is an enlarged fragmentary transverse vertical sectional view taken substantially upon the plane indicated by section line 6—6 of FIGURE 4;

FIGURE 7 is an enlarged fragmentary transverse vertical sectional view taken substantially upon the plane indicated by section line 7—7 of FIGURE 4.

Figure 1:
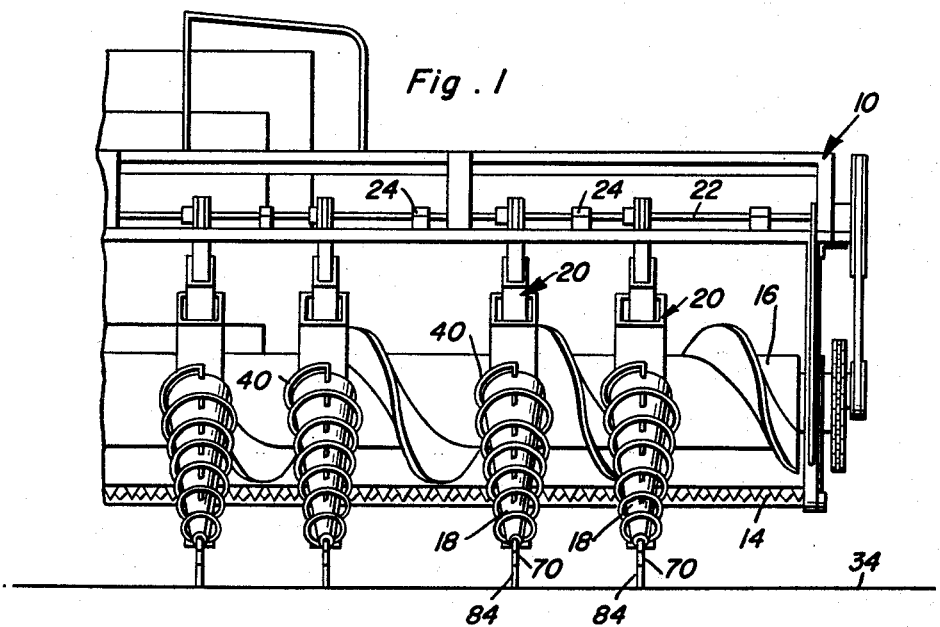
FIGURE 1 is a fragmentary front elevational view of a conventional type of crop pickup machine shown with the attachment of the instant invention incorporated therein.
Figure 2:
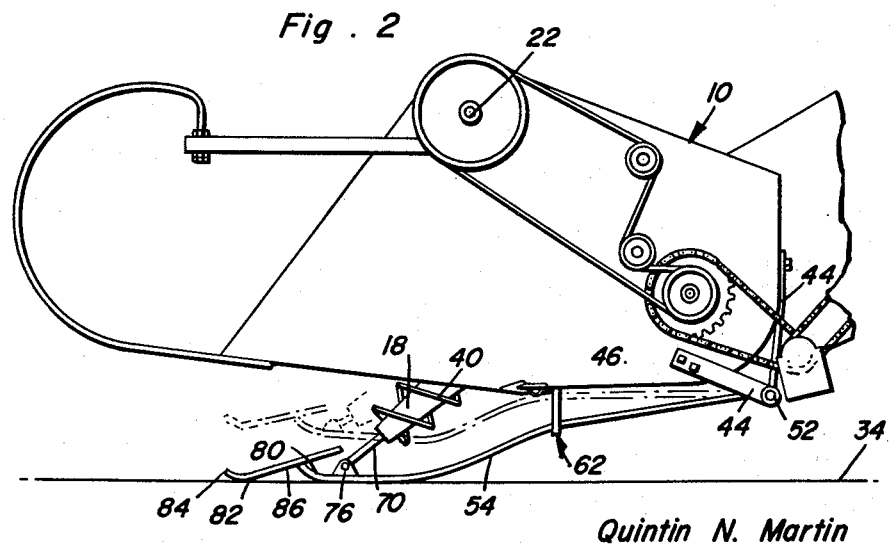
FIGURE 2 is a side elevational view of the embodiment illustrated in FIGURE 1 as seen from the right side of FIGURE 1 and with alternate positions of one of the conveyor rolls shown in phantom lines.
Figure 3:
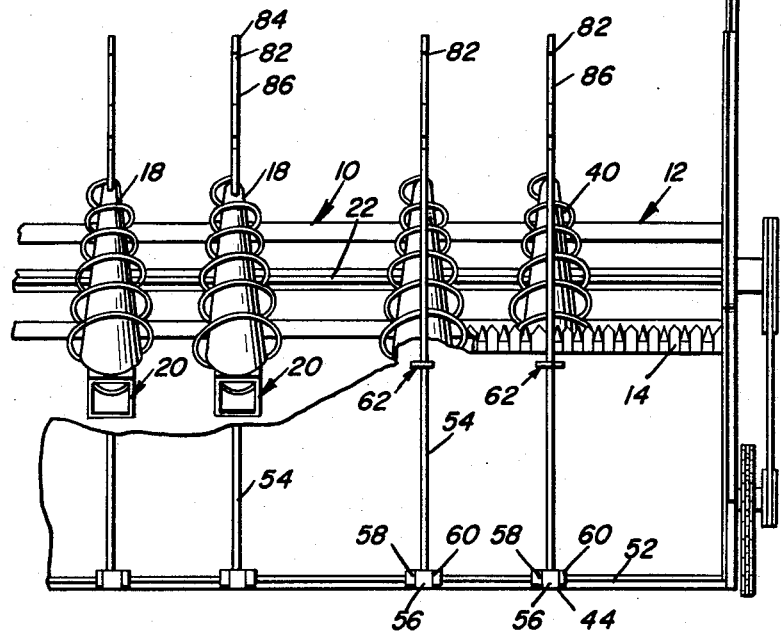
FIGURE 3 is a fragmentary bottom plan view of the embodiment illustrated in FIGURE 1 with parts thereof being broken away.

Referring now more specifically to the drawings the numeral 10 generally designates a crop pickup machine which includes a main frame generally referred to by the reference numeral 12. The main frame 12 includes the usual cutter bar assembly 14 and auger type conveyor 16 and is also provided with a plurality of forwardly and downwardly inclined pickup or conveyor rolls 18. Each of the pickup rolls 18 is conical and has its minor diameter end portion disposed lowermost. The major diameter end portion of each crop pickup roll 18 is rotatably supported from a supporting arm member generally referred to by the reference numeral 20. A transversely extending lay shaft 22 is provided and is journalled for rotation by means of journal blocks 24 supported from the main frame 12. Each major diameter end portion of the conveyor rolls 18 is provided with a stub axle 26, see FIGURE 5, on which there is secured a driven pulley 28. The lay shaft 22 is provided with a plurality of drive pulleys 30 and each drive pulley 30 is drivingly connected to the corresponding driven pulley 28 by means of an endless flexible belt 32.

It is to be understood that the main frame 12 is provided with supporting wheels (not shown) and that the main frame 12 may be raised and lowered relative to the support means in order that the conveyor rolls 18 may have their lower ends disposed at varying elevations relative to the ground 34.

The auger conveyor includes a central discharge chute 34 and a rear wall 36 which curves forwardly at its lower end to form a bottom wall 38 that underlies the auger conveyor 16. The cutter assembly 14 is carried by the forward end of the bottom wall 38 and each of the conveyor rolls 18 is provided with helical pickup means 40 which are adapted to engage fallen crops at the lower end of the conveyor rolls and to stand the fallen crop upright for cutting by the cutter assembly 14 and subsequent delivery into the conveyor assembly defined by the auger conveyor 16 and the rear and bottom walls 36 and 38.

All of the preceding description may be considered as conventional and it is to be understood that in conventional crop pickup machines, the support arm members 20 are fixed to the main frame 12 against movement about a horizontal axis extending transversely of the main frame 12 although in some crop pickup machines the support arm members or equivalent components are mounted for oscillatory movement about said longitudinal axes in order that the free lower ends of the conveyor rolls 18 may be spread apart or moved closer together to conform to the spacing of row crops.

The present invention however utilizes a pivotal connection between the upper ends of each of the support arm members 20 and the main frame 12 which is referred to by the reference numeral 42. In this manner, it may be seen from FIGURE 4 of the drawings that the lower free ends of the conveyor rolls 18 may be raised and lowered independently.

Figure 8:
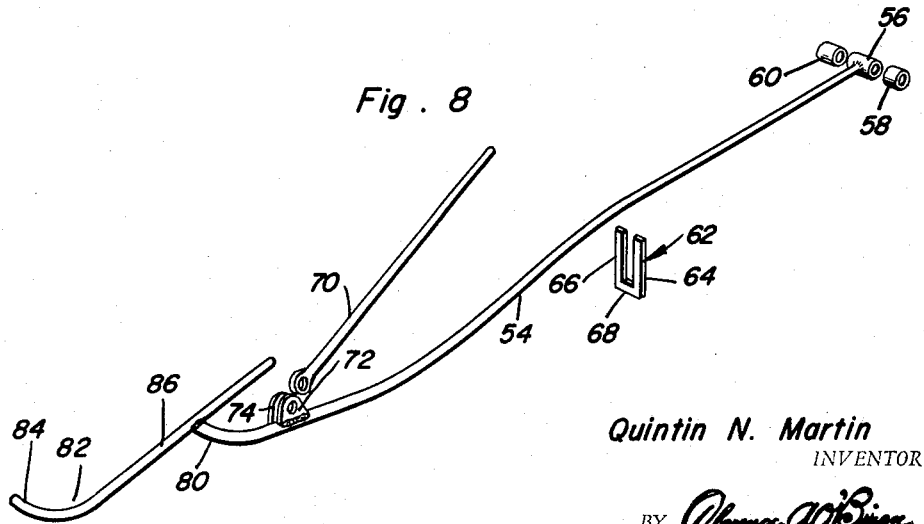
FIGURE 8 is an exploded perspective view of one of the ground engaging skids of the attachment.

A pair of opposite side supporting brackets 44 are provided and are secured to the opposite side walls 46 and 48 of the housing 50 of the machine 10 and the rear wall 36 of the housing 50. A transversely extending and horizontally disposed support shaft 52 is supported from the support bracket 44 and a plurality of skid arm members 54 are each provided with sleeve portions 56 on one end, see FIGURE 8, which rotatably receive the support shaft 52. A pair of stop collars 58 and 60 are provided for each skid arm member 54 and are secured to the support shaft 52 on opposite sides of each of the sleeve portions 56 to prevent axial shifting of the latter.

A generally U-shaped abutment member referred to in general by the reference numeral 62 is also provided for each skid arm member 54 and includes a pair of legs 64 and 66 interconnected at their lower ends by means of a bight portion 68. The U-shaped abutment members 62 are secured to the bottom wall 38 just rearwardly of the cutter assembly 14 in dependent relation with the legs 64 and 66 of each abutment member 62 spaced transversely of the bottom wall 38. The mid-portion of each skid arm member 54 is slidingly received between the corresponding pair of legs 64 and 66 and the bottom wall 38 comprises an abutment for limiting upward swinging movement of the forward end of each skid arm member 54 while each bight portion 68 comprises an abutment for limiting downward swinging movement of the free end of the corresponding skid arm member 54.

Each skid arm member 54 includes a shaft member 70 which has one end pivotally secured to the corresponding skid arm member 54 between the furcations 72 and 74 carried by the forward end thereof by means of a pivot pin 76. The other end of each shaft member 70 is rotatably and slidably received within a blind bore 78 formed in the minor diameter end portion of the corresponding conveyor roll 18 and in this manner it may be seen that raising of the forward end of each skid arm member 54 will in turn raise the forward and downwardly inclined free end of the corresponding conveyor roll 18.

The forward end of each skid arm member 54 is curved upwardly as at 80 and has secured to its terminal end portion a secondary skid and ramp member 82. Each skid and ramp member 82 includes a forwardly and upwardly directed forward end portion 84 and a rearwardly and upwardly directed end portion 86 to which the forward terminal end portion of the corresponding skid arm member 54 is secured. The forwardly and upwardly inclined portion 84 of each skid and ramp member 82 will ride over raised portions of the ground 34 and the rearwardly and upwardly directed portion of each skid and ramp member 86 will provide means by which fallen crops may be lifted slightly for engagement with the helical pickup means 40. In addition, the rear end portion 86 of each skid and ramp member 82 will raise fallen crops above the pivotal connection between the corresponding shaft member and skid arm member. Finally, the skid and ramp members 82 are constructed in a manner whereby if they are moved into an abnormally high portion of the ground 34 they will break off leaving the forwardly and upwardly directed free terminal end portion of the corresponding skid arm member 54 exposed to ride over subsequent raised portions of the ground 34. In this manner, should unusually high portions of the ground 34 be encountered, severe damage will not be incurred and it is merely necessary to replace the damaged or broken skid and ramp member 82.

The bight portions 68 for limiting downward swinging movement of the free ends of the skid arm members 54 may be utilized in order to raise all of the conveyor rolls 18 when the main frame 12 is lifted relative to the ground engaging support wheels (not shown) thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A crop pickup machine comprising a main frame adapted to be forwardly advanced over a field, said main frame including a plurality of conveyor rolls, support members mounting said rolls from said frame for rotation about forwardly projecting and downwardly inclined axes, means mounting said support members from said frame for limited free swinging movement about generally horizontally disposed axes extending transversely of said frame, a skid arm member for at least one of said rolls and extending front to rear of said frame, means pivotally supporting the rear end of said arm member from said frame for limited free pivotal movement about a generally horizontally disposed axis extending transversely of said frame and spaced laterally of said axes, and means carried by the forward end of said arm member rotatably and slidably connected with the associated roll for rotation of the latter relative to said forward end of said arm member and axial movement of said roll relative to said arm member upon simultaneous swinging movement of said roll and arm member relative to said frame, the forward end of said arm member including a skid portion disposed below the lower end of said one roll and adapted to slidingly engage and thereby support said one roll from the ground.

2. The combination of claim 1 wherein said skid portion includes a rearwardly and upwardly directed pickup ramp disposed forwardly of the lower end of the corresponding roll.

3. The combination of claim 1 including abutment means on said frame engageable by said arm member for limiting upward swinging movement of the forward end of said arm member and the associated roll.

4. The combination of claim 1 including abutment means on said frame engageable by said arm member for limiting downward swinging movement of the forward end of said arm member and the associated roll.

5. The combination of claim 4, said frame also including abutment means engageable by said arm member for limiting upward swinging movement of the forward and of said arm member and the associated roll.

6. The combination of claim 1 wherein said axis of rotation of said support members is disposed above the most adjacent portion of the axis of rotation of the corresponding roll.

7. The combination of claim 1 wherein said one roll includes sleeve bearing defining means on its lower end whose axis at least generally coincides with the axis of rotation of said one roll, said skid arm member means rotatably and slidably connected with said one roll comprising a rearwardly and upwardly projecting shaft member whose upper end is rotatably and slidably received in said sleeve bearing defining means and lower end is pivotally secured to the corresponding arm member for rotation about an axis extending transversely of said frame and shaft and arm members.

8. The combination of claim 7 wherein said skid portion includes a rearwardly and upwardly directed pickup ramp disposed forwardly of the lower end of the corresponding roll.

References Cited in the file of this patent

UNITED STATES PATENTS

| | | |
|---|---|---|
| 2,399,774 | Welty | May 7, 1946 |
| 2,949,717 | Johannesen | Aug. 23, 1960 |
| 2,970,420 | Schmidt | Feb. 7, 1961 |

FOREIGN PATENTS

| | | |
|---|---|---|
| 454,362 | Canada | Feb. 1, 1949 |